(12) United States Patent
DeGrazia

(10) Patent No.: US 9,242,610 B2
(45) Date of Patent: Jan. 26, 2016

(54) QUICK RELEASE LICENSE PLATE HOLDER

(71) Applicant: US Mill Works LLC, Seattle, WA (US)

(72) Inventor: Bradley Richard DeGrazia, Seattle, WA (US)

(73) Assignee: US MILL WORKS LLC, Seattle, WA (US)

( * ) Notice: Subject to any disclaimer, the term of this patent is extended or adjusted under 35 U.S.C. 154(b) by 25 days.

(21) Appl. No.: 14/203,283

(22) Filed: Mar. 10, 2014

(65) Prior Publication Data

US 2015/0251608 A1    Sep. 10, 2015

(51) Int. Cl.
*G09F 7/00* (2006.01)
*B60R 13/10* (2006.01)
*F16M 13/02* (2006.01)

(52) U.S. Cl.
CPC .............. *B60R 13/105* (2013.01); *F16M 13/02* (2013.01)

(58) Field of Classification Search
USPC ............... 248/223.41, 224.51, 224.61, 224.7, 248/228.31; 40/200, 201, 202
See application file for complete search history.

(56) References Cited

U.S. PATENT DOCUMENTS

| | | | | |
|---|---|---|---|---|
| 6,247,257 B1 * | 6/2001 | Powell | ............................ | 40/591 |
| 6,553,697 B1 * | 4/2003 | Pichan | ............................ | 40/591 |
| 7,712,810 B2 * | 5/2010 | Tanaka et al. | ................ | 296/1.11 |
| 7,818,905 B1 * | 10/2010 | Stahel et al. | .................... | 40/492 |
| 9,050,938 B2 * | 6/2015 | Tran | | |

* cited by examiner

*Primary Examiner* — Steven Marsh
(74) *Attorney, Agent, or Firm* — Schwabe, Williamson & Wyatt, P.C.

(57) ABSTRACT

In an example, a quick release license plate holder with a low and/or compact profile is provided. In an example, the holder includes a bolt assembly having a first end to attach to a vehicle and a second end to quick release a support plate for holding the vehicle license plate. In an example, the quick release and re-attachment may be tool-less and/or may not require a re-leveling. In another example, the quick release may not require the same specific tool as a typical OEM license plate bracket and/or may require less application of the same specific tool.

15 Claims, 7 Drawing Sheets

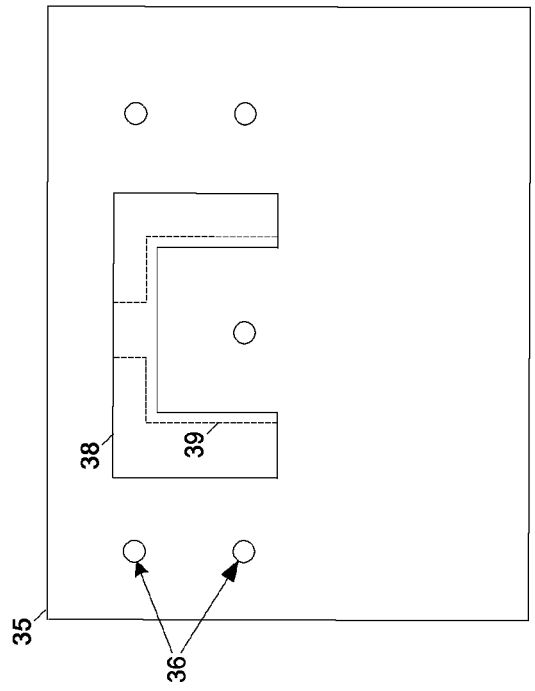
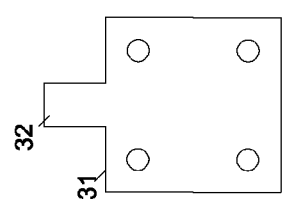
FIG. 3

QUICK RELEASE LICENSE PLATE HOLDER

COPYRIGHT NOTICE

©2014 US Mill Works LLC. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71(d).

BACKGROUND OF THE INVENTION

Mechanized car washes can snag a license plate attached to a vehicle or the Original Equipment Manufacturer (OEM) license plate bracket, bending the license plate or causing damage to the license plate bracket and/or the vehicle, or both. It is known that an OEM license plate bracket may be removed from a vehicle prior to washing the vehicle using the mechanized car wash. Removal and reattachment of known OEM license plate bracket may require a specific tool or may be time intensive, or both.

Aftermarket equipment to replace the OEM license plate bracket is known. Aftermarket equipment may be marketed as more resistant to damage associated with mechanized car washes. However, aftermarket equipment may be installed differently on the vehicle than the OEM license plate bracket, which can create compatibility issues with other vehicle equipment, such as parking sensors. For example, if the aftermarket equipment extends too far from the vehicle, the parking sensor could be erroneously triggered; however, this is only one example of possible compatibility issues (other compatibility issues may involve interference with cruise control or other sensors, radiator operation, etc.). In addition, as the configuration/condition of the mechanized car washes can vary from one location or another, it is still possible to have damage when using a mechanized car wash with the aftermarket equipment installed, and removal/reattachment of some known aftermarket license plate equipment may require the same specific tool or may still be time intensive, or both.

SUMMARY OF THE INVENTION

The following is a summary of the invention in order to provide a basic understanding of some aspects of the invention. This summary is not intended to identify key/critical elements of the invention or to delineate the scope of the invention. Its sole purpose is to present some concepts of the invention in a simplified form as a prelude to the more detailed description that is presented later.

In an example, a quick release license plate holder with a low and/or compact profile is provided. In an example, the holder includes a bolt assembly having a first end to attach to a vehicle and a second end to quick release a support plate for holding the vehicle license plate. In an example, the quick release and re-attachment may be tool-less and/or may not require a re-leveling (e.g. may not require re-leveling after removal and reattachment for, say, utilizing a mechanized car wash). In another example, the quick release may not require the same specific tool as a typical OEM license plate bracket and/or may require less application of the same specific tool.

In an example, the support plate slidingly engages with the second end of the bolt assembly. The support plate includes a front surface to engage with the vehicle license plate and a back surface having a shoe. In an example, the shoe forms an enclosure with a portion of the back surface of the support plate to provide a low and/or compact profile. In an example, the second end of the bolt assembly comprises a cleat having at least one edge structured to be removeably inserted into the enclosure.

Additional aspects and advantages of this invention will be apparent from the following detailed description of preferred embodiments, which proceeds with reference to the accompanying drawings.

BRIEF DESCRIPTION OF THE DRAWINGS

FIG. 3 illustrates a front view of an example bolt assembly and a rear view of an example support plate for a low and/or compact license plate holder.

DETAILED DESCRIPTION OF PREFERRED EMBODIMENTS

Figure 1:
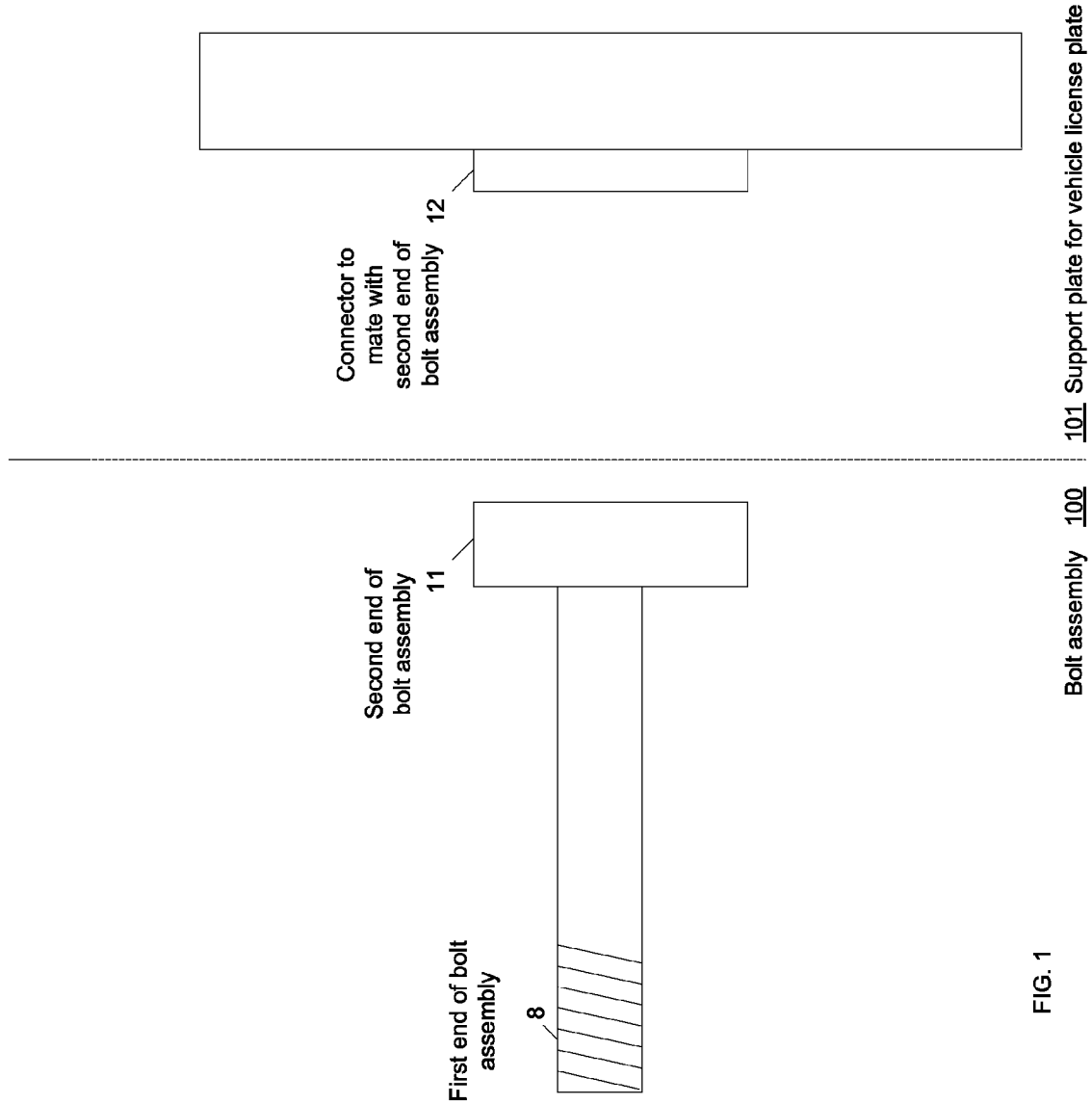
FIG. 1 illustrates license plate holder with a quick release feature.

FIG. 1 illustrates license plate holder with a quick release feature.

The bolt assembly 100 includes a first end 8 and a second end 11. The first end 8 may be threaded for installation in a threaded hole of a motor vehicle. In an example, the second end 11 may be rotatable relative to a remainder of the bolt assembly 100, e.g. the first end 8. In another example, the second end 11 may be rotatable and pivotable relative to a remainder of the bolt assembly 100.

The support plate 101 includes a first surface to which a license plate may be attached and a second surface. The second surface may correspond to a connector 12 to mate with the second end 11 of the bolt assembly 100. The connector 12 may be structured to releasably couple, e.g. slidingly engage, to the second end 11.

In an example, the support plate 101 may be manufactured using sheet metal. In one such example, the first end 8 may include at least one prong, and the second end 11 may include an opening to mate with the prong. In an example, a support plate manufactured using sheet metal includes at least one tongue to form an opening to receive a prong of the first end 8. The support plate manufactured using sheet metal may include an indented portion with an opening on the top or bottom, e.g. a slit cut on the top or bottom of the indented portion.

Figure 2:
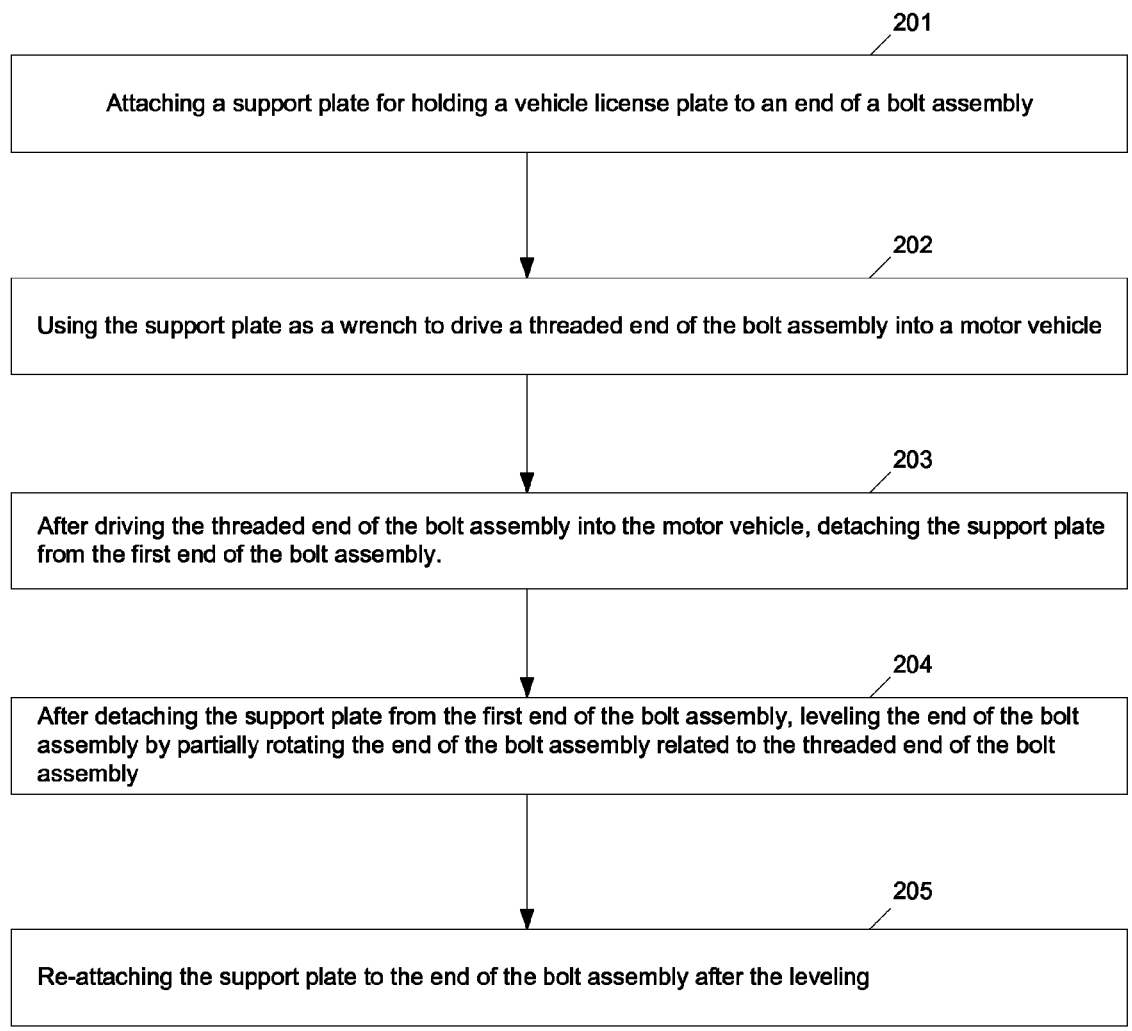
FIG. 2 illustrates a process for installing the license plate holder of FIG. 1.

FIG. 2 illustrates a process for installing the license plate holder of FIG. 1 onto a vehicle.

In block 201, support plate 101 is attached to the end 11 of the bolt assembly 100, e.g. slidingly engaged with the end 11 of the bolt assembly 100. In block 202, the support plate 101 may be used as a wrench to drive the threaded end 8 of the bolt assembly 100 into a motor vehicle.

In block 203, after driving the threaded end 8 of the bolt assembly 100 into the motor vehicle, the support plate 100 may be detached, e.g. released, from the end 11 of the bolt assembly 100. In block 204, a user may partially rotate the end 11 of the bolt assembly 100 relative to the threaded end 8 of the bolt assembly 100 for leveling. In an example, a component of the bolt assembly 100 may be loosened, released, removed, etc., in order to partially rotate the end 11. For example, a tool such as a hex key may be used to loosen at least one fastener to allow the partial rotation, and the fastener(s) may be tightened once the leveling is complete.

In block 205, the support plate 101 may be re-attached to the bolt assembly 101. In an example, the re-attachment may include slidingly engaging the support plate 101 with the bolt assembly 100.

FIG. 3 illustrates a front view of an example bolt assembly and a rear view of an example support plate for a low and/or compact profile license plate holder.

The bolt assembly 310 includes a cleat 31. The support plate 311 includes a back surface having a plurality 36 of holes arranged in a matrix. The matrix is a 2×5 matrix in the illustrated example, although in other examples the matrix may be greater or smaller than the illustrated matrix, for example a 2×8 matrix, a 3×11 matrix, etc. In an example, the cleat has at least one member 32.

A shoe 38 is mounted on a selected subset of the holes of the plurality 36. In an example, the exposed surface of the shoe 38 has a u-shape. The subset of the plurality 36 may be selected for compatibility in regard to positioning the license plate on the vehicle and/or user preference. In the illustrated example, the shoe 38 is mounted as an upside down "U". In other examples where the matrix includes at least three rows of holes, the shoe 38 may be mounted as a forwards or backwards "C" to maximize compatibility in regard to positioning the license plate on the vehicle and/or user preference, which may address compatibility concerns with regard to sensors, radiator operation, etc.

The opposite surface of the shoe 38, i.e. a surface that makes contact with the back surface of the support plate 311, has a smaller footprint (illustrated by the dashed line 39). The shoe 38 forms an enclosure with a portion of the back surface of the support plate 311. A portion of an edge of the cleat 31 may be removably inserted into the enclosure that is formed by portion of the back surface of the support plate 311 and the shoe 38 to mount the support plate 311 on the bolt assembly 310. When the cleat 31 is removably inserted into the enclosure that formed by portion of the back surface of the support plate 311 and the shoe 38, the front surface of the cleat 31 is adjacent to the back surface of the support plate 311.

The opposite surface of the shoe 38 may also be u-shaped with at least one cutout. Each cutout may correspond to a member of the at least one member 32. In an example, the cutout only partially defines an opening for at least one member 32 of the cleat 31 (the opening is defined by the opposite surface of the shoe 38 and the back surface of the support plate 311). In an example, the member 32 extends through the opening defined by the opposite surface of the shoe 38 and the back surface of the support plate 311. The protruding portion of the member 32 may have a pinhole (not illustrated) through which a pin, e.g. a cotter pin, may be inserted in order to secure the support plate 311 to the bolt assembly 310. In the example including the pinhole, the pin when inserted may be oriented parallel to the back surface of the support plate 311.

It is noted that the demarking of the dashed line 39 applies to this particular example. In other examples, the footprint of the back surface of the shoe 38 is larger than the footprint of the opposite surfaces in order to form the enclosure with a portion of the back surface of the support plate 311, but neither footprint necessarily need to have the same shape or dimensions shown. In another example, the overhang may correspond to only a portion of the interior edge of the shoe 38, e.g. the oppositely facing interior edges.

Figure 4:
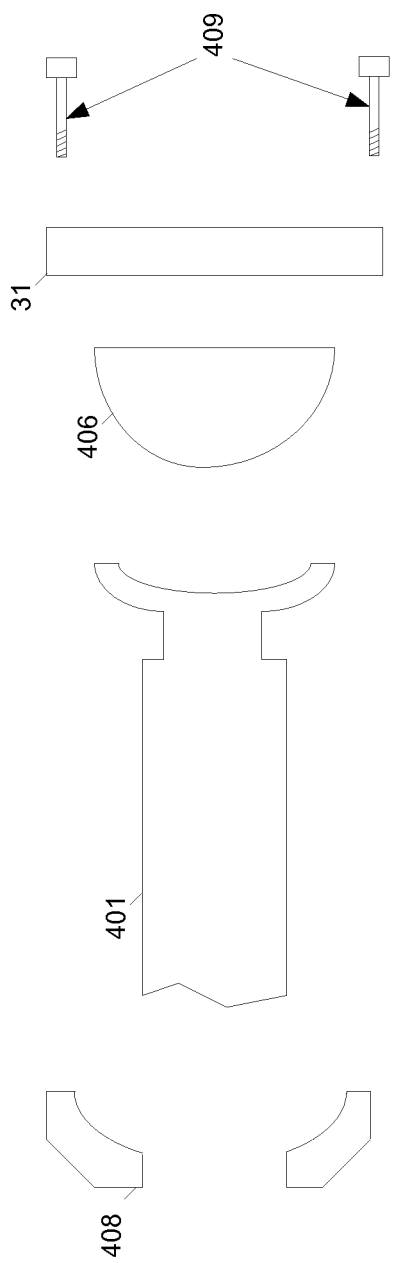
FIG. 4 illustrates a cross-sectional side view of a portion of the bolt assembly of FIG. 3.

FIG. 4 illustrates a cross-sectional side view of a portion of the bolt assembly of FIG. 3.

A portion of a stud 401 of the bolt assembly 310 is shown (the end for securing to the vehicle, e.g. a threaded end, is not shown). An end of the stud 401 includes a cup having an inner sidewall to mate with a partial sphere 406. In an example, the partial sphere 406 may be constructed from a different material than the stud 401, e.g. plastic.

A collar 408 having a curved interior surface slips over the stud 401 to mate with an outer sidewall of the cup. The collar 408 may have one or more openings (not illustrated) by which a plurality 409 of fasteners such as hex end screws may be used to connect the cleat 31 and the collar 408.

When the fasteners of the plurality 409 are inserted but not tightened, e.g. loosened, the cleat 31 may be pivoted relative to the stud 401 for leveling and/or other adjustment. The surfaces of the fasteners of the plurality 409 may be flush or recessed with respect to the front surface of the cleat 31 when tightened. When tightened, the collar 408 and the cleat 31 operate as a clamp to fix a position of the collar 408, the partial sphere 406, and the cleat 31 relative to the stud 401.

Referring now to FIGS. 3 and 4, it can be seen that the quick release license plate holder has a low and/or compact profile, which may reduce compatibility concerns with certain vehicles such as vehicles with parking sensors. A portion of the front surface of the cleat 31 may make contact with a portion of the back surface of the support plate 35.

The thickness of the cleat 31 may be determined based on numerous application specific variables, including but not limited to application requirements, the size of the front surface of the cleat 31, the material used for the cleat 31, operating environment, etc. However, when the cleat 31 is removably inserted into the enclosure formed by the back surface of the support plate 311 and the shoe 38, a distance between the back surface of the support plate 311 and a front surface of a component of the bolt assembly 310 corresponds to the thickness of the cleat 31. In the illustrated example, the distance between the back surface of the support plate 311 and the front surface of the collar 408 corresponds to the thickness of the cleat 31.

Figure 5:
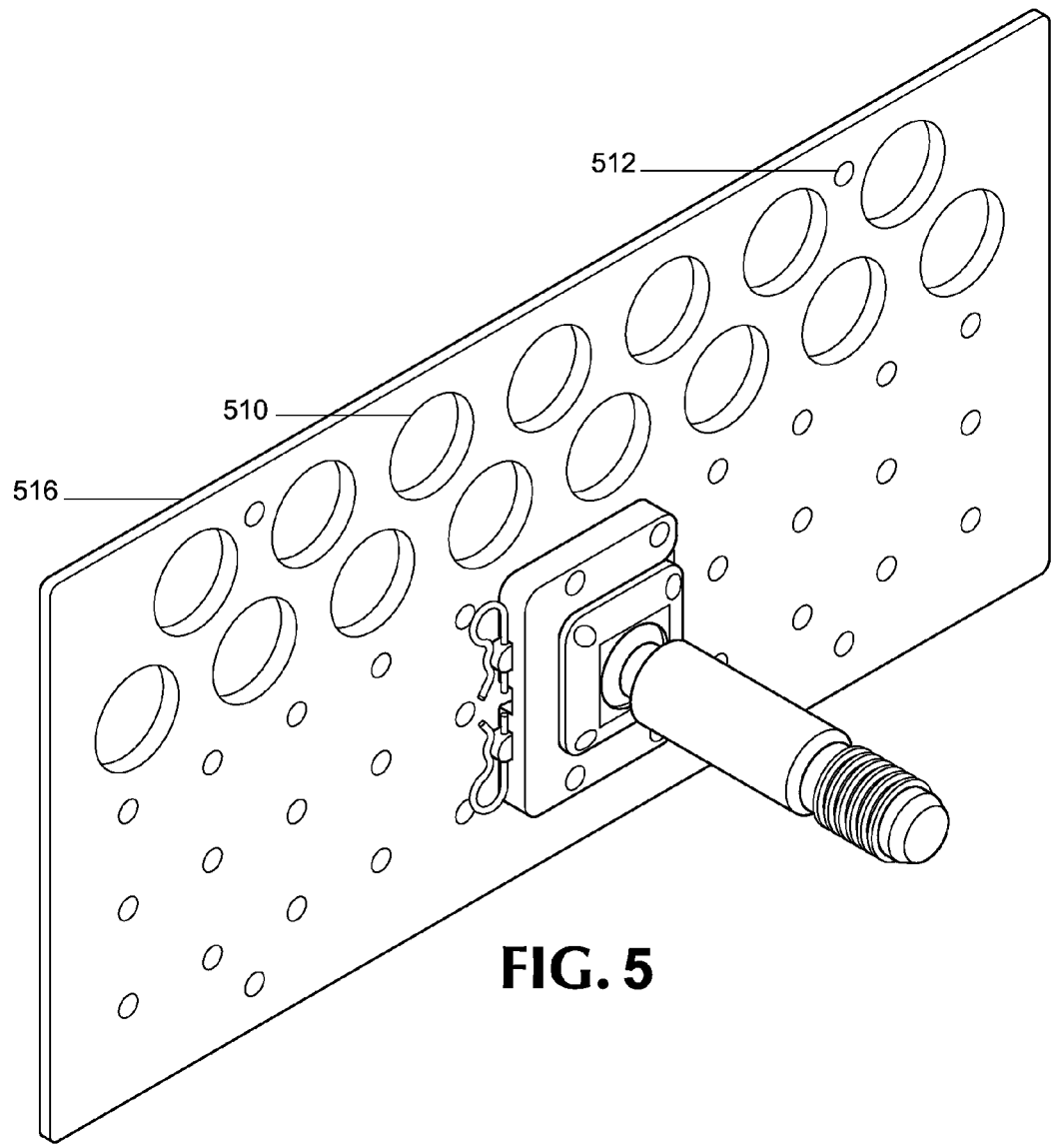
FIG. 5 illustrates another example of a license plate holder.

FIG. 5 illustrates another example of a license plate holder.

The license plate holder 500 includes a 3×11 matrix of holes for mounting a shoe. The license plate holder 500 also includes larger openings 510, e.g. larger holes, for weight reduction. The remaining holes 512 are for attaching a license plate to a front of the support plate 516 of the license plate holder 500.

Figure 6:
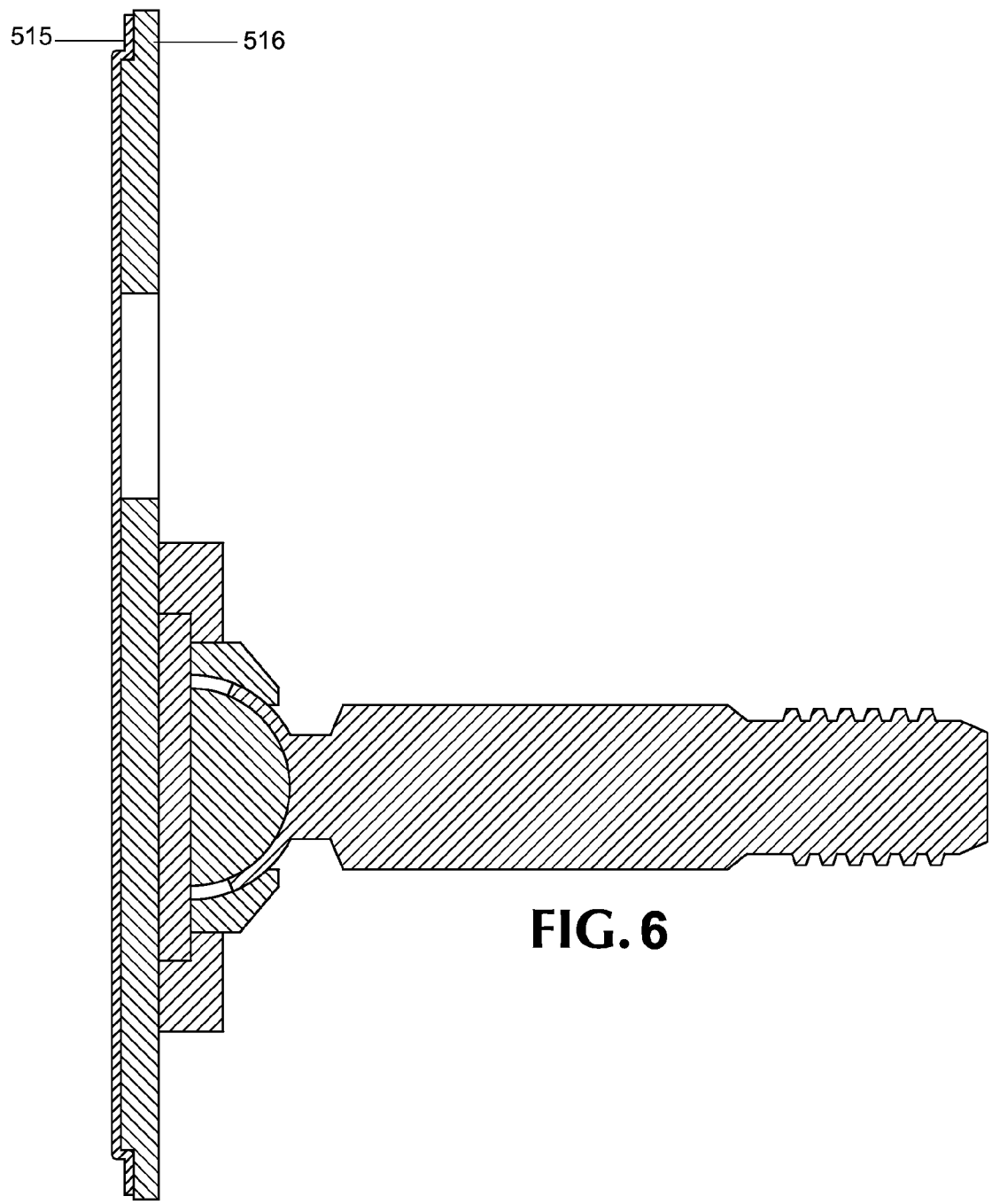
FIG. 6 illustrates a cross-sectional side view of the license plate holder of FIG. 5.

FIG. 6 illustrates a cross-sectional side view of the license plate holder of FIG. 5.

In FIG. 6, the license plate 515 is shown attached to the front of the support plate 516. The front of the support plate 516 has a shape to mate with a shape of a back of the license plate 515.

Figure 7:
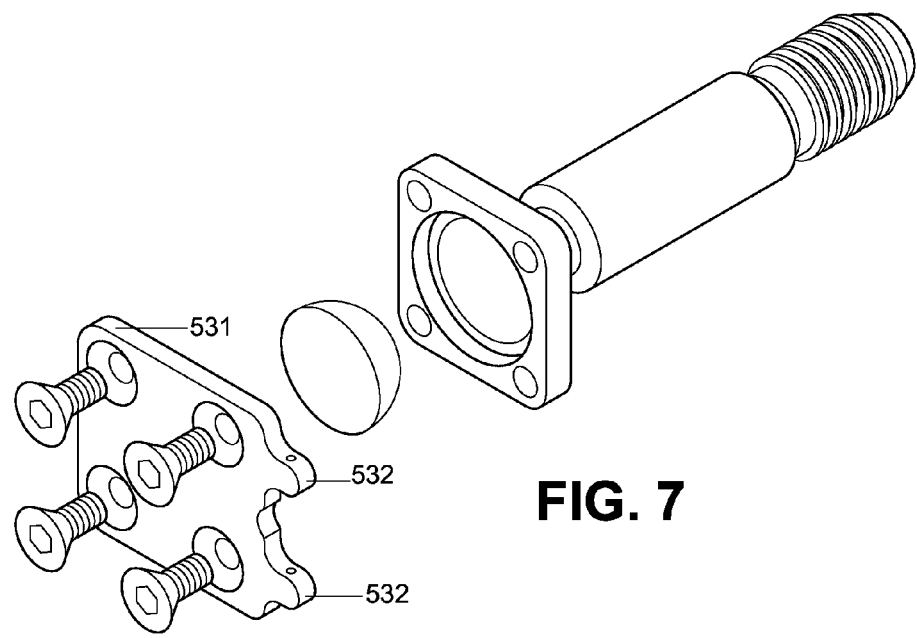
FIG. 7 illustrates an exploded view of the bolt assembly of the license plate holder of FIG. 5.

FIG. 7 illustrates an exploded view of the bolt assembly of the license plate holder of FIG. 5.

Figure 8:
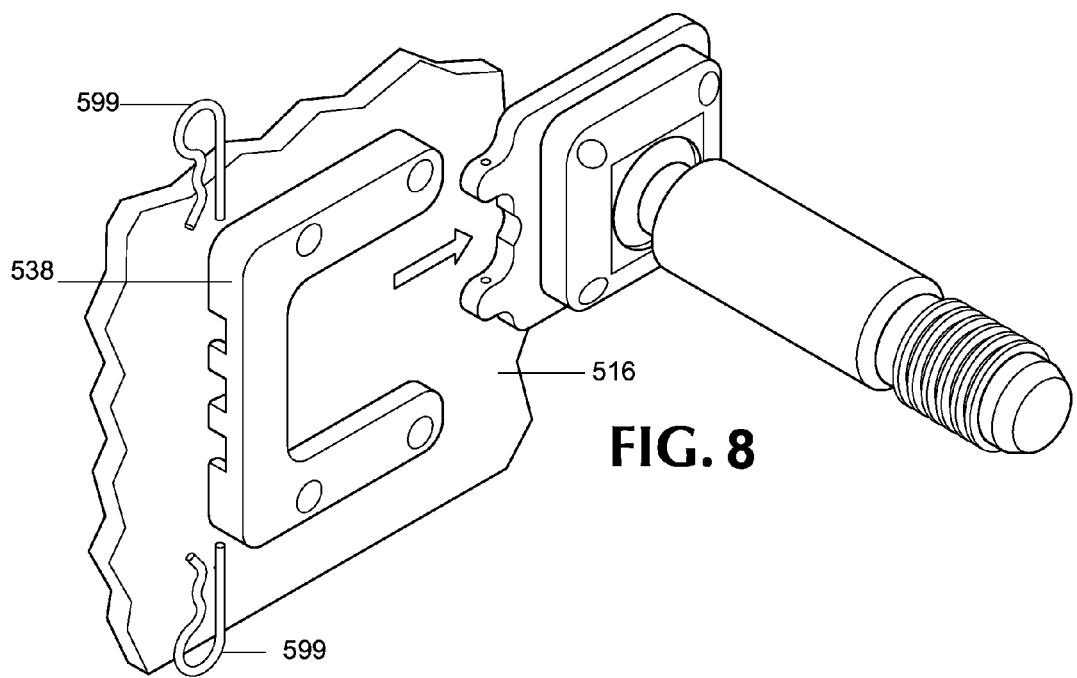
FIG. 8 illustrates a quick release the support plate of the license plate holder of FIG. 5 from the bolt assembly.

The cleat 531 includes two members 532. FIG. 8 illustrates that each of the members 532 is removed from an enclosures that is formed by portion of the back surface of the support plate 516 and the shoe 538 (after the cotter pins 599 are removed), which releases the support plate 516 from a vehicle.

It will be obvious to those having skill in the art that many changes may be made to the details of the above-described embodiments without departing from the underlying principles of the invention. The scope of the present invention should, therefore, be determined only by the following claims.

Having described and illustrated the principles of the invention in a preferred embodiment thereof, it should be apparent that the invention may be modified in arrangement and detail without departing from such principles. We claim all modifications and variations coming within the spirit and scope of the following claims.

The invention claimed is:

1. An apparatus, comprising:
a support plate for holding a vehicle license plate, the support plate having a front surface to engage with the vehicle license plate and a back surface having a shoe, the shoe forming an enclosure with a portion of the back surface of the support plate; and
a bolt assembly having a first end to secure to a vehicle and a second end to slidingly engage with the support plate;
wherein the second end of the bolt assembly comprises a cleat having at least one edge structured to be removeably inserted into the enclosure.

2. The apparatus of claim 1, wherein the shoe is removably attached to the support plate.

3. The apparatus of claim 1, wherein a footprint of an exposed first surface of the shoe is greater than a footprint of a second opposite surface of the shoe.

4. The apparatus of claim 3, wherein the exposed first surface is u-shaped.

5. The apparatus of claim 4, wherein the opposite second surface is u-shaped with at least one cutout that only partially defines an opening for at least one member of the cleat.

6. The apparatus of claim 5, wherein the opening is defined by the second opposite surface of the shoe and the back surface of the support plate.

7. The apparatus of claim 1, wherein the bolt assembly comprises a stud, and wherein the cleat is rotatably attached to the stud.

8. The apparatus of claim 7, wherein an end of the stud comprises a cup having an inner sidewall to mate with a partial sphere by which the rotatably attached stud is pivotably attached to the cleat.

9. The apparatus of claim 8, wherein the bolt assembly further comprises a collar having a curved interior surface to mate with the outer sidewall of the cup.

10. The apparatus of claim 1, wherein cleat comprises at least one member to extend through an opening when the at least one edge is inserted into the enclosure, the opening defined by the shoe and the back surface of the support plate.

11. The apparatus of claim 10, wherein a protruding portion of the member comprises a pinhole structured to receive a pin to secure the support plate to the bolt assembly.

12. A method, comprising:
attaching a support plate for holding a vehicle license plate to first end of a bolt assembly;
using the support plate as a wrench to drive a second threaded end of the bolt assembly into a vehicle;
after driving the threaded second end of the bolt assembly into the vehicle, detaching the support plate from the first end of the bolt assembly;
after detaching the support plate from the first end of the bolt assembly, leveling the first end of the bolt assembly by partially rotating the first end of the bolt assembly relative to the second threaded end of the bolt assembly; and
re-attaching the support plate to the first end of the bolt assembly after the leveling.

13. The method of claim 12, further comprising securing the support plate to the first end of the bolt assembly after re-attaching the support plate to the first end of a bolt assembly.

14. The method of claim 13, wherein securing the support plate to the first end of the bolt assembly further comprises inserting at least one pin into a pinhole disposed on at least one of the support plate or the first end of the bolt assembly.

15. The method of claim 12, wherein detaching the support plate from the first end of the bolt assembly further comprises slidingly disengaging the support bracket from the first end of the bolt assembly.

* * * * *